United States Patent [19]
Okamura

[11] Patent Number: 5,601,352
[45] Date of Patent: Feb. 11, 1997

[54] IMAGE DISPLAY DEVICE

[75] Inventor: Toshiro Okamura, Hino, Japan

[73] Assignee: Olympus Optical Co., Ltd., Tokyo, Japan

[21] Appl. No.: 504,472

[22] Filed: Jul. 20, 1995

[30] Foreign Application Priority Data

Jul. 29, 1994 [JP] Japan .................................. 6-178156

[51] Int. Cl.[6] ................................................. G03B 21/00
[52] U.S. Cl. .............................. 353/31; 359/630; 349/112
[58] Field of Search ........................... 353/31, 33, 37, 353/7, 8; 359/69, 471, 475, 477, 630

[56] References Cited

U.S. PATENT DOCUMENTS

| | | | |
|---|---|---|---|
| 4,088,400 | 5/1978 | Assouline et al. | 359/69 |
| 4,239,349 | 12/1980 | Scheffer | 359/69 |
| 4,416,515 | 11/1983 | Funada et al. | 359/69 |
| 4,824,216 | 4/1989 | Perbet et al. . | |
| 4,838,655 | 6/1989 | Hunahata et al. | 353/31 |
| 4,969,731 | 11/1990 | Ogino et al. | 353/38 |
| 5,122,887 | 6/1992 | Mathewson | 359/53 |
| 5,159,478 | 10/1992 | Akiyama | 359/69 |
| 5,315,330 | 5/1994 | Hamada | 353/31 |

FOREIGN PATENT DOCUMENTS 2-28623A  1/1990  Japan .

*Primary Examiner*—William Dowling
*Attorney, Agent, or Firm*—Watson Cole Stevens Davis, P.L.L.C.

[57] ABSTRACT

An image display device of eye projection type for use in a head-mounted display is disclosed. The image display device comprises an image display means for displaying a video image, and a projection optical system for projecting an image displayed on the image display means onto eyes of a viewer; said image display means including a plurality of liquid crystal display elements juxtaposed on the same optical axis as an optical axis of the projection optical system and an illuminating means arranged behind the plural liquid crystal elements and for generating substantially collimated luminous flux.

18 Claims, 7 Drawing Sheets

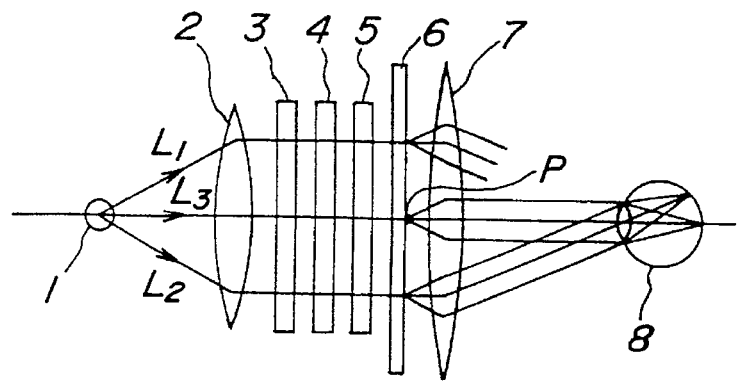
FIG_1
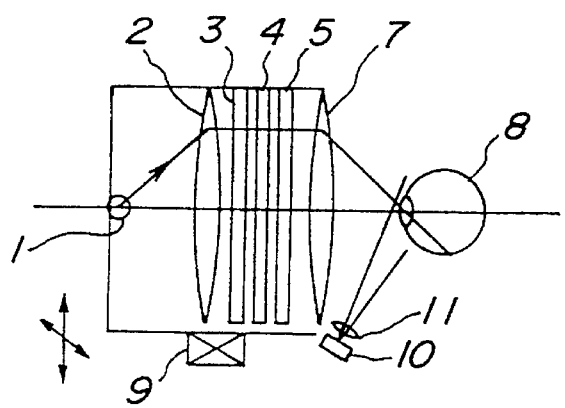
FIG_2
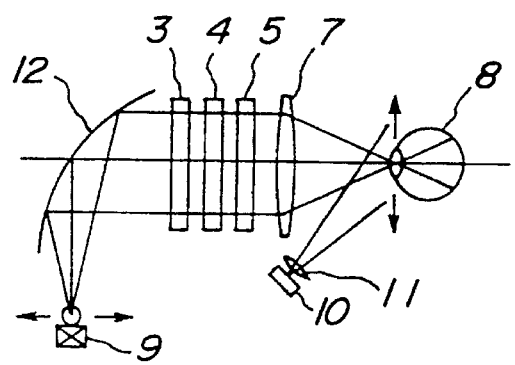
FIG_3

FIG_6

FIG_9
PRIOR ART
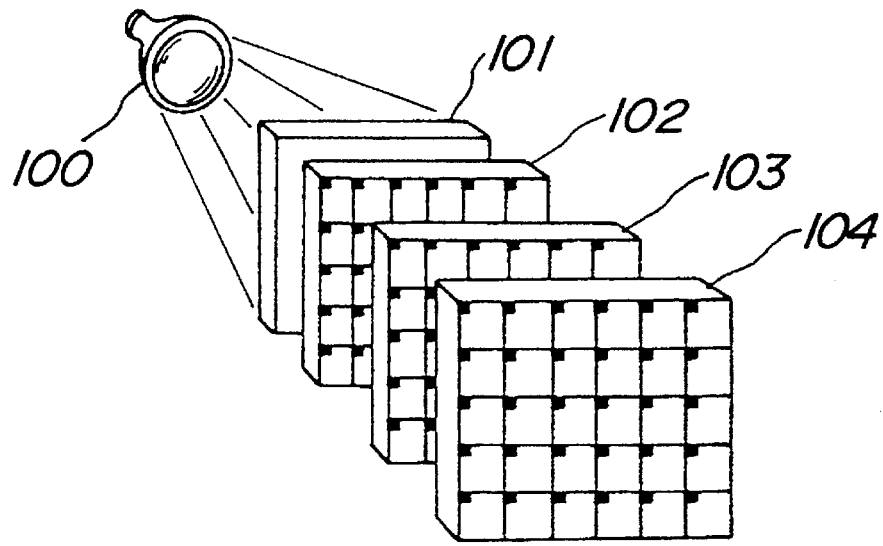
FIG_10
PRIOR ART
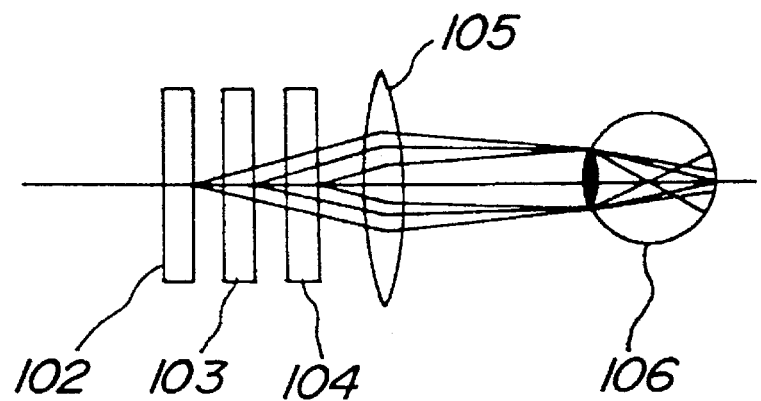

IMAGE DISPLAY DEVICE

BACKGROUND OF THE INVENTION

1. Field of the Invention

The present invention relates to an image display device for enjoying video image of a large screen alone, irrespective of indoors and outdoors, more particularly an image display device of an eye projection type.

2. Related Art Statement

As such an image display device, the image display devices of various types are proposed, but these devices are constructed so as to view or observe the image, under the condition that it is not affected by the ambient light, through an optical system incorporated therein, and to enjoy the sound.

The image display device of an eye projection type is constructed so as to be capable of displaying the image stereoscopically, so that it has become a center of attraction as a new video apparatus used among the younger generation.

As an image display element for use in the image display device of eye projection type, in order to form a complete color image, an LCD (liquid crystal display) of multi-color matrix type capable of triggering a finite number of pixels, which can be addressed respectively, is proposed (Japanese patent laid open No. 28,623/90).

As shown in FIG. 9, a polarizing plate 101 and three LCDs 102, 103 and 104 of matrix type are arranged in the order given in front of a light source 100. In this case, if a voltage is applied to the LCD 102, the LCD 103 and the LCD 104, respectively, blue color, red color and green color is absorbed, respectively. When the voltage is not applied to the whole LCDs, whole colors are transmitted. Then, if, for example, the LCD 102 is made OFF condition, the LCD 103 is made ON condition and the LCD 104 is made OFF condition, cyan is displayed. Therefore, each pixel of respective LCDs is made ON or OFF condition, so that required color image can be formed.

However, in the above conventional example, as shown in FIG. 10, if respective LCDs 102 to 104 are viewed by eyes 106 through an ocular lens 105, the following inconveniences arise. That is, for example, if the ocular lens 105 is in-focused to the LCD 103, both the LCDs 102 and 104 become out-focused, so that blurring arises for the LCDs 102 and 104. Even if the ocular lens 105 is focused to other LCDs, the above conditions are the same, and thus adequate resolving power can not be obtained for the whole array of LCDs.

SUMMARY OF THE INVENTION

It is an object of the present invention to eliminate the above described disadvantages of the conventional image display device.

It is another object of the present invention to provide an image display device of an eye projecting type capable of obtaining adequate resolving power, even in an image display device juxtaposed with an LCD as a filter of a subtractive color mixing process in the optical axis direction.

According to the present invention, there is provided an image display device of eye projection type comprising an image display means for displaying a video image, and a projection optical system for projecting an image displayed on the image display means onto eyes of a viewer; said image display means including a plurality of liquid crystal display elements juxtaposed on the same optical axis as an optical axis of the projection optical system and an illuminating means arranged behind the plural liquid crystal elements and for generating substantially collimated luminous flux.

According to the present invention, the plural liquid crystal display elements are three liquid crystal display elements performing color display by a subtractive color mixing which absorbs different wavelength regions, respectively. The relative positional relation between the eye projection optical system and the plural liquid crystal display elements is different, but substantial collimated light is illuminated from the backside of the plural liquid crystal display elements, so that the focusing shift can be prevented. Moreover, the plural liquid crystal display elements are juxtaposed on the same optical axis as the projection optical system, so that the space factor of the device can be decreased, and thus the device can be downsized.

A luminous flux diffusion optical system for diffusing the luminous flux from the plural liquid crystal display elements is arranged between the plural liquid crystal display elements and the projection optical system.

In this case, the collimated luminous flux is diffused by the luminous flux diffusion optical element, thereby leading the image coincident with the focusing to the eyes by the eye projection optical system. Moreover, the exit pupil formed by the projection optical system becomes large, so that the pupil distance of the viewer must not be adjusted.

The illuminating means comprises a point light source and a collimated luminous flux converting optical element by which its focus is set near the point light source so as to convert the luminous flux from the point light source into a substantially collimated luminous flux.

In this case, even if the point light source is used, the divergent light can be collimated by the collimating luminous flux optical system, so that the image having no color shift can be observed.

According to the present invention, in such a way, even the relative positional relation of the eye projection optical system and the plural liquid crystal elements is different, substantially collimated luminous flux illuminates from the back side of the plural liquid crystal elements, so that the inconvenience of the focal shifts can be removed. Also since the luminous flux diffusion optical system is arranged between the plural liquid crystal elements and the projection optical system, thereby leading on the eyes the image focused by the projection optical system with the use of the diffusing surface as a display surface. The collimated luminous flux can easily be formed by the point light source and the collimated luminous flux converting optical element.

In an embodiment of the image display system according to the present invention, the luminous flux diffusion optical system is a diffraction grating.

In a preferable embodiment of the eye projection image display device according to the present invention, it further comprises a measuring means for measuring an inter-relation between a pupil position of a viewer observing an image displayed on the image display element and a position of luminous flux incident on the pupil of the viewer and a moving means for adjusting a positional relation of the pupil and the luminous flux by moving at least one of the illuminating means, the plural liquid crystal display elements and the projection optical system from the data of the positional relation measured by the measuring means.

In this case, the position of the exit pupil can be moved as described above, so that even if the diameter of the exit pupil is small, the exit pupil can be moved at the position capable of observing the images properly.

In a further preferable embodiment of the image display device according to the present invention, it further comprises a measuring means for measuring an inter-relation between a pupil position of a viewer for observing an image displayed on the image display element and a position of luminous flux incident on the pupil of the viewer and a moving means for adjusting a positional relation of the pupil and the luminous flux by moving the point light source from the data of the positional relation measured by the measuring means.

In this case, the point light source is moved, and thus the position of the exit pupil can be moved, so that even if the diameter of the exit pupil is small, the exit pupil can be moved at the position capable of observing the images properly. Also, in addition that the moving means may be small, the moving range of the point light source is small, so that whole the device can be downsized.

In a further preferable embodiment of the image display device according to the present invention, an image display device of eye projection type comprises:

an image display means including a point light source, a plural of liquid display elements superimposed and disposed at a position on which the luminous flux of the point light source is incident;

a projection optical system having a half mirror provided on a light path of the image display means and a back surface reflecting mirror providing with a coating surface so as to make its refractive index larger than 1 (n>1);

a plurality of the image display means being provided so as to be able to display on right and left eyes of the viewer; and a plurality of the projection optical system being provided so as to lead the plural images on right and left eyes of the viewer.

In this case, the position of the exit pupil is moved based on the information obtained from the means of detecting the positional shift of the exit pupil, so that even if the diameter of the exit pupil is small, coincidence of the pupil can be performed automatically and easily.

The projection optical system consists of a prism constructed by a half mirror and a back-surface reflecting mirror in a unit form.

The half mirror and the back surface reflecting mirror are so arranged that the luminous flux emanated from the half mirror forms a bent light path by the back surface reflecting mirror.

BRIEF DESCRIPTION OF THE DRAWINGS

FIG. 1 is an explanatory view showing first embodiment of eye projection image display device according to the present invention;

FIG. 2 is an explanatory view showing second embodiment of eye projection image display device according to the present invention;

FIG. 3 is an explanatory view showing third embodiment of eye projection image display device according to the present invention;

FIG. 9 is a perspective view showing conventional image display device; and FIG. 10 is a perspective view showing conventional image display device.

DETAILED EXPLANATION OF THE PREFERRED EMBODIMENT

Figure 4:
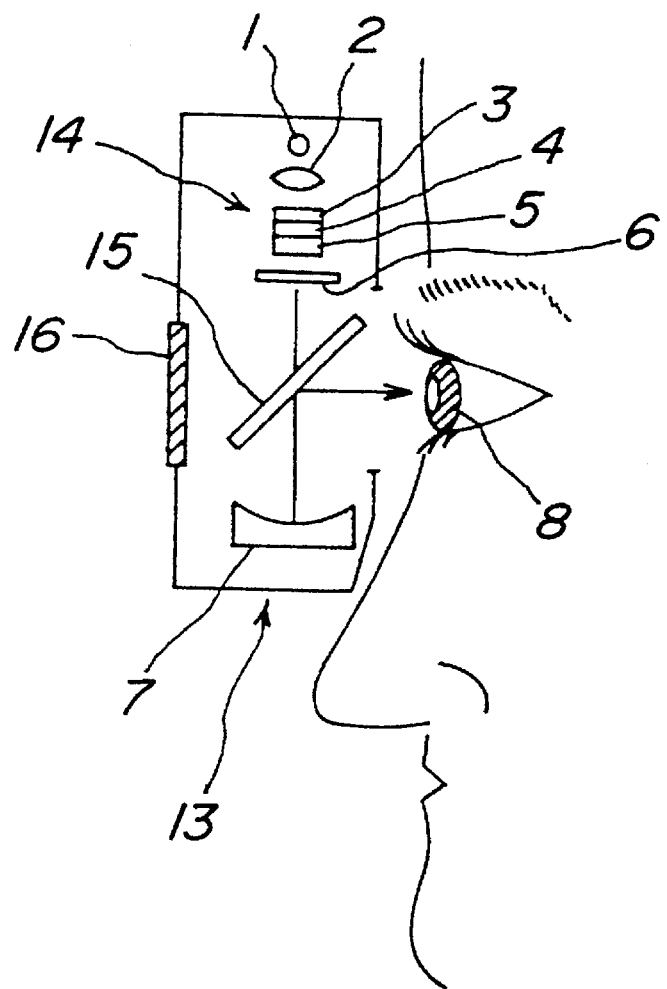
FIG. 4 is an explanatory view showing a head-mounted image display device accommodated in the eye projection image display device according to the present invention.

Now to the drawings, there are shown various embodiments of an image display device according to the present invention. Like parts are shown by corresponding reference characters throughout several views of the drawings.

FIG. 1 shows a first embodiment of an image display device according to the present invention. A collimator lens (collimated luminous flux converting optical element) 2 is provided in the light illuminating direction of a point light source 1 formed by a filament ball or a pin hole, and a first LCD (liquid crystal element) 3, a second LCD 4, a third LCD 5 and a diffusing plate (luminous flux diffusion optical system) 6 are arranged with a certain distance in collimated light transmitting direction from the collimator lens 2, and an ocular lens 7 is disposed in the light diffusing direction of the diffusing plate 6. The plurality of LCDs (liquid crystal element) color-display with a subtractive and mixed color process for absorbing different wavelengths. Reference numeral 8 designates an eye.

The function of the first embodiment is now explained. The luminous flux emanated from the point light source 1 becomes a collimated luminous flux by focusing the collimator lens 2 on the point light source 1. This collimated luminous flux is illuminated on the first LCD 3, the second LCD 4 and the third LCD 5. The collimated luminous flux modulated by the LCDs is led onto the eye 8 to observe the image.

Respective LCDs are made a multi-color matrix type capable of triggering a finite number of addressable pixels and can receive a field at any position.

Respective LCDs transmit whole light flux when the field is not applied thereon. While the first LCD 3 absorbs blue light when the field is applied thereon, the second LCD 4 absorbs red light when the field is applied thereon, and the third LCD 5 absorbs green light when the field is applied thereon, so that desired color can be displayed by changing the field applied to the first LCD 3, the second LCD 4 and the third LCD 5.

In such a way, for example, the light L3 of the collimated lights modulated by the LCDs is diffused by the diffusing plate 6 as shown. In this case, only the light L3 arrives at a point P on the diffusing plane of the diffusing plate 6. The lights L1 and L2 are not incident on the point P. Since the luminous flux emanated from the point light source 1 becomes a collimated luminous flux by the collimator lens 2, the light transmitted through respective pixels of LCDs at the position spatially corresponding to the lights L1, L2, L3 and respective LCDs 3, 4, 5, is diffused by the diffusing plate 6, transmitted through an ocular lens 7 to reach the eyes 8, thereby observing the light. The ocular lens 7 may, therefore, be focused on the diffusing plate 6, so that the focusing shift between respective LCDs 3, 4, 5 may be cancelled.

If the diffusing plate 6 is not provided, the light transmitted through respective LCDs 3, 4, 5 reaches the eyes 8 as very thin luminous without diffusing, so that there is a risk that the image can not suitably be observed, and a concern that the pupil distance of the viewer is adjusted. In the first embodiment, however, wide luminous light reaches the eyes 8, so that the pupil distance must not be adjusted. Moreover, the focusing shift between respective LCDs 3, 4, 5 does not occur, so that the image having a high resolution ratio can be observed. As a method of obtaining substantially collimated luminous light, a laser light can also be used.

FIG. 2 shows a second embodiment of the image display device according to the present invention. Like parts are shown by corresponding reference characters shown in FIG. 1. In this embodiment, the diffusing plate 6 shown in FIG. 1 can be omitted between the third LCD 5 and the ocular lens 7. An actuator 9 is also provided near the collimator lens 2 and respective LCDs 3, 4, 5 so as to move them, and a small CCD 10 is provided at the field position of the eyes. Reference numeral 11 is an imaging lens. The other construction is the same as that of the first embodiment.

The function of the image display device according to the second embodiment is explained as follows. The light from the point light source 1 is collimated by the collimator lens 2, to illuminate three LCDs 3, 4, 5. The light transmitted through respective LCDs 3, 4, 5 is further transmitted through the ocular lens 7 and incident on the eyes 8, thereby observing the image. The concrete function of respective LCDs 3, 4, 5 has been explained in the first embodiment, so that its detailed explanation is omitted.

In this embodiment, the diffusing plate 6 is not provided, so that under this condition, the luminous flux reached at the eyes 8 is very fine, and thus the pupil distance of the viewer must be adjusted. However, in this embodiment, the necessity of pupil distance adjustment is dealt with as follows.

That is, the periphery of the eyes is imaged by the small CCD 10 at the field position of the eyes to measure the positional relation of the luminous flux and the eye pupil, and respective LCDs 3, 4, 5 and the collimeter lens 2 are moved by the actuator 9 based on its measured value. Then, the luminous flux is moved to lead it to the eye pupil suitably. In this way, the fine beam is moved by the CCD 10 and the actuator 9 and thus the luminous flux is led to the eye pupil suitably, thereby observing the images.

The embodiment of the control circuit is now explained with reference to the actuator 9. The signal from the CCD 10 is supplied to the image display device (not shown) to detect the positional relation between the luminous flux and the eye pupil, and the detected data is supplied to a controller (not shown) to drive the actuator 9.

In this embodiment, also, the collimated luminous flux is incident on the ocular lens 7 by the collimator lens 2 provided behind respective LCDs 3, 4, 5, so that the image having a high resolution ratio can be observed without causing focal shift, which is the same as the first embodiment. In this embodiment, the diffusing plate 6 is not used, and the occurrence of the chromatic aberration can be prevented.

FIG. 3 shows a third embodiment of the image display device according to thew present invention. In this embodiment, a concave mirror 12 is provided instead of the collimator lens 2 used in the second embodiment, the point light source 1 is provided inside the concave mirror 12 and can be moved by the actuator 9. The other construction is the same as the second embodiment, so that its detailed explanation is omitted.

The function of the image display device according to the third embodiment is explained as follows. The luminous flux emanated from the point light source 1 is incident on the concave mirror 12, and reflected thereon to form collimated light, which is incident on respective LCDs 3, 4, 5. The luminous flux transmitted through the these LCDs is incident on the ocular lens 7 to lead it on the eyes. The concave lens 12 is a half mirror and a shutter (not shown) is provided before the concave mirror 12, so that the external sight and the electronic sight can be observed by changing them.

In this embodiment, also, the diffusing plate is not provided, so that under this condition, the luminous flux reached at the eyes is very fine, and thus the pupil distance of the viewer must be adjusted. However, in this embodiment, the necessity of pupil distance adjustment is dealt with by the same means as the second embodiment.

That is, the periphery of the eyes is imaged or observed by the small CCD 10 at the field position of the eyes to measure the positional relation of the luminous flux and the eye pupil, and the point light source 1 is moved by the actuator 9 based on its measured value. Then, the luminous flux is moved to lead it to the eye pupil suitably. This embodiment is constructed so as to move the luminous flux by moving the point light source 1, so that the small actuator such as a piezo element can be utilized and thus the overall device can be downsized. The control circuit for the actuator is the same as that of the second embodiment.

In this embodiment, also, the collimated luminous flux is incident on the ocular lens 7 by the concave mirror 12 provided behind respective LCDs 3, 4, 5, so that the image having a high resolution ratio can be observed without causing focal shift, as in the same manner as the previous embodiment.

FIG. 4 shows an embodiment in which the eye projection image display device according to the present invention is incorporated in a head-mounted image display device 13 of a spectacles type or a goggle type. As shown in FIG. 4, the eye projection image display device 14 according to the first embodiment is provided over the head-mounted image display device 13. A half mirror 15 is arranged between the diffusing plate 6 and a concave mirror (ocular lens) 7. In case of observing the image, this image is transmitted through the half mirror 15 and reflected on the ocular lens 7 to lead it to the eyes 8.

Moreover, a shutter 16 is provided before the half mirror 15, so that an external light or sight is incident on the half mirror 15 by opening the shutter 16 and thus the external sight can be observed. Shutter 16 can be a mechanical shutter capable of opening and closing mechanically, or it can be a liquid crystal shutter capable of operating by ON and OFF of the power source.

Figure 5:
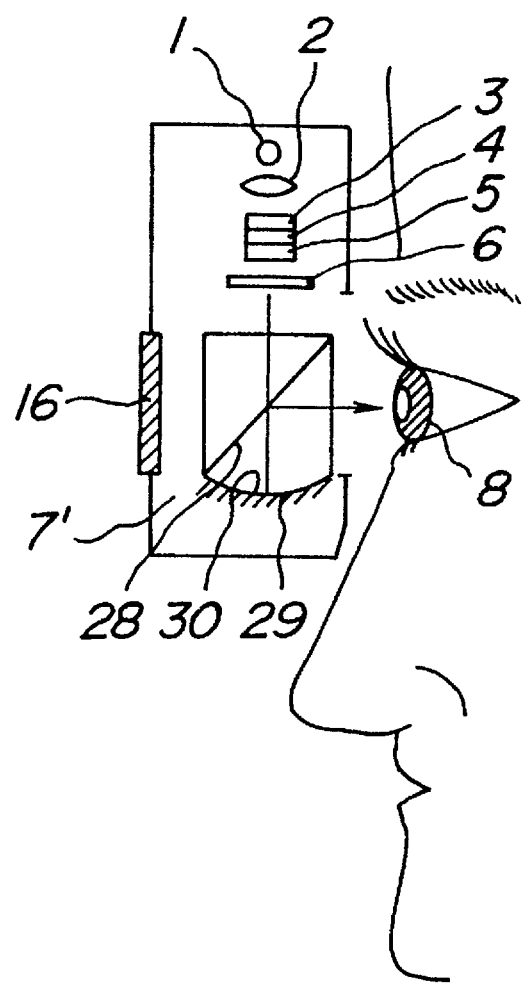
FIG. 5 is an explanatory view showing a modification of the image display device shown in FIG. 4.

FIG. 5 shows a modification of the eye projection image display device shown in FIG. 4. In this embodiment, an ocular lens 7' is used instead of the ocular lens 7 shown in FIG. 4. The ocular lens 7' comprises a half mirror 28 and a back-surface reflection mirror 30 having a coating surface 29 provided on the back surface thereof, which are formed in a unity form as a prism. As shown in FIG. 5, it is preferable that the ocular lens 7' is formed as a prism, since the occurrence of the aberration can be decreased in comparison with the reflection in air surface.

In this embodiment, an optical path from the plural liquid crystal display elements 3, 4, 5 passes through the half mirror 28, is reflected on the back-surface reflection mirror 30, and is reflected on the half mirror 28 to lead it to a pupil 8 of the viewer. In this case, a folded optical path is formed between the half mirror 28 and the back-surface reflection mirror 30.

The ocular lens 7' formed as a prism has a refractive index n larger than one (n>1).

Figure 6:
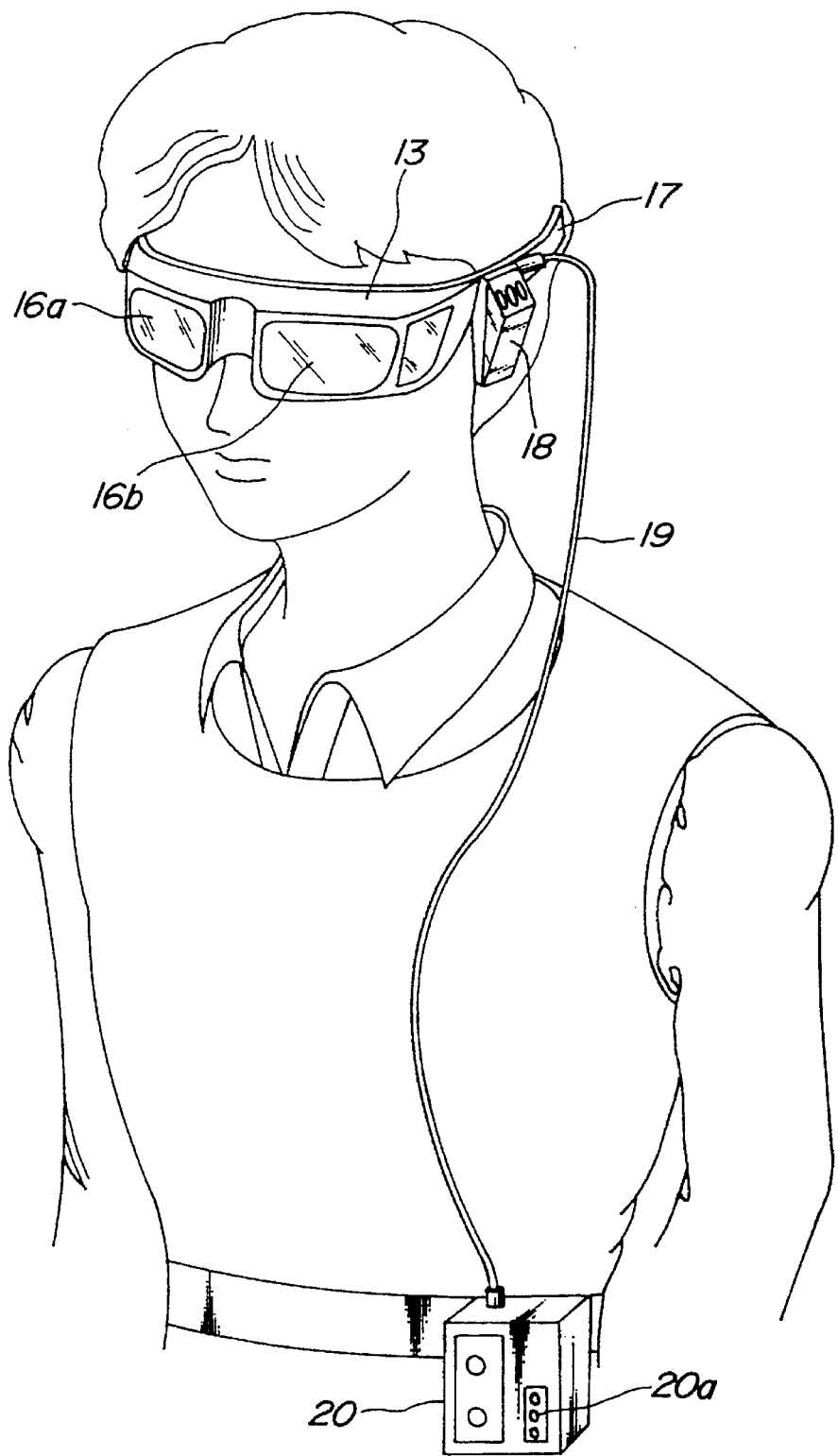
FIG. 6 is an explanatory view showing a head-mounted image display device accommodated in the eye projection image display device according to the present invention.

FIG. 6 shows a utilizing mode of the head-mounted image display device 13 shown in FIG. 4. The head-mounted image display device 13 is provided with a band 17, by which the display device 13 can be mounted on the head of the viewer. As the band 17, it may be selected and utilized following holding members, such as a holder in which its fitting state to the head is adjusted by screws or the like, a hard head fitting holder in which pressing force to the head is adjusted by its own spring pressure, or a lubber band fitting holder.

The band 17 is provided with a head-phone 18, by which a stereoscopic sound can be heard together with a image observation. As shown in FIG. 6, a reproducing device 20 of a portable video cassette or the like is provided to the head-mounted image display device 13 having a head phone 18 through a video and sound transmission cord 19, so that the viewer can enjoy the video image and the stereoscopic sound by carrying the reproducing device 20 on any position such as the belt wearing position or the like. Reference numeral 20a is a switch and a volume adjusting section of the reproducing device 20.

Figure 7:
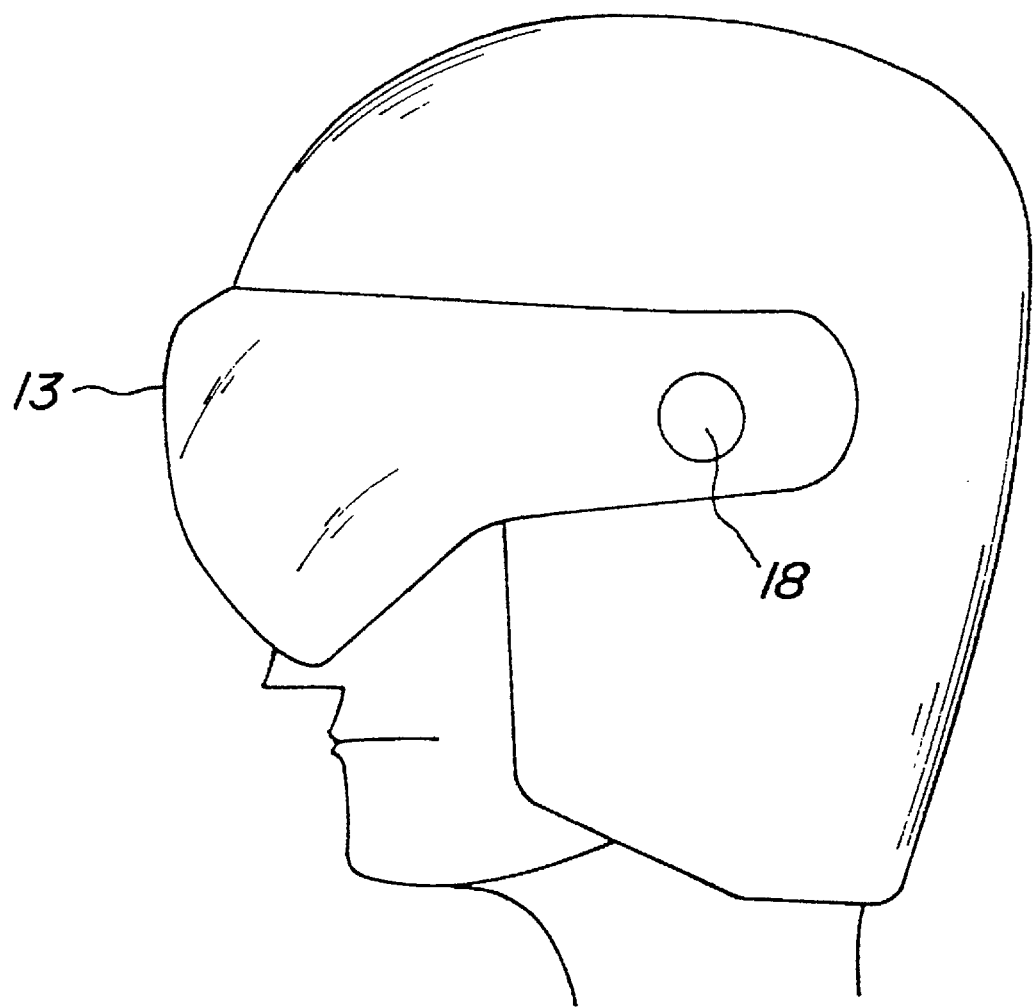
FIG. 7 is an explanatory view showing a head-mounted image display device accommodated in the eye projection image display device according to the present invention.

FIGS. 7 and 8 show other utilization modes of the head-mounted image display device 13. FIG. 7 shows the head-mounted image display device 13 capable of use as a helmet type in which the eye projection image display device is accommodated. Reference numeral 18 is a head phone, to which the reproducing device 20 shown in FIG. 6 (but not shown in FIG. 7) is connected to the head-mounted image display device 13 through the video and sound transmission cord 19.

Figure 8A:
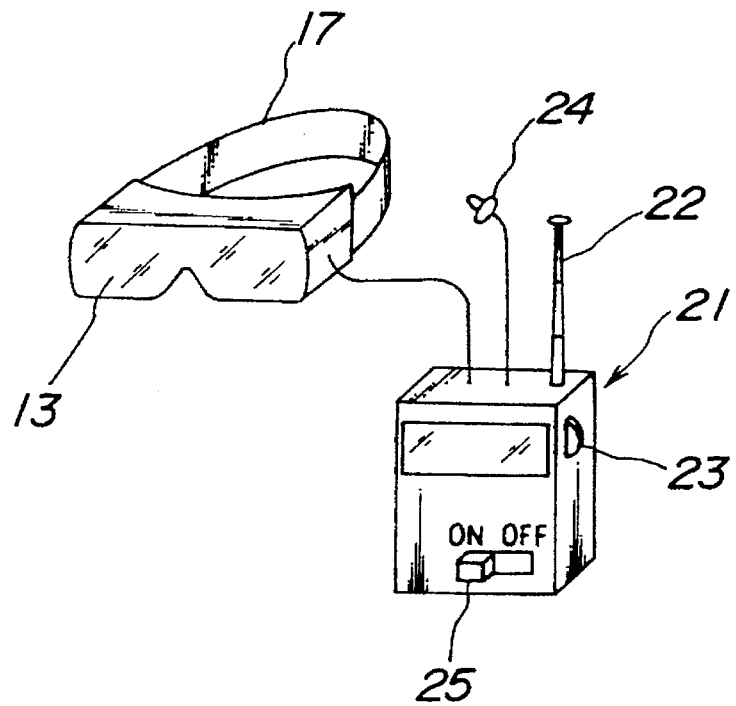
FIG. 8a is a perspective view showing a combination of a head-mounted image display device accommodated in the eye projection image display device according to the present invention and a television tuner.

FIG. 8 shows another utilization mode of a combination of the head-mounted image display device 13 and a television tuner or a video cassette deck. That is, FIG. 8a shows the mode of a combination of the head-mounted image display device 13 and a television tuner 21. Reference numeral 22 is an antenna for receiving television signals, numeral 23 is a knob for adjusting television channels, numeral 24 is an ear phone and numeral 25 is an ON/OFF switch.

Figure 8B:
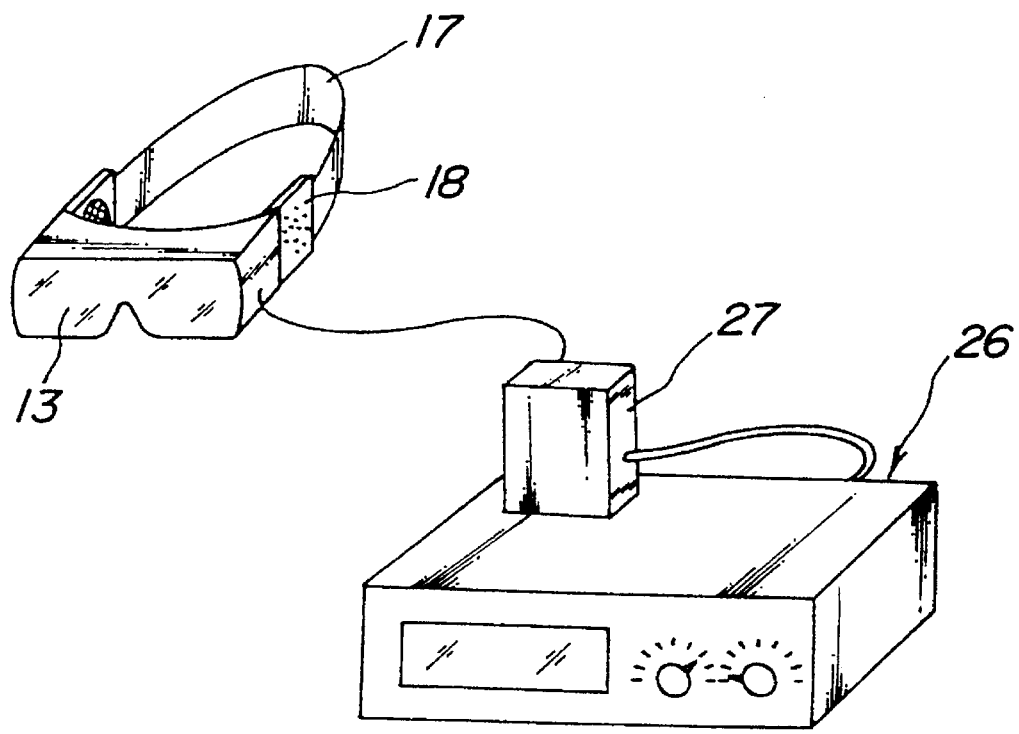
FIG. 8b is a perspective view showing a combination of a head-mounted image display device accommodated in the eye projection image display device according to the present invention and a video cassette deck.

FIG. 8b shows the mode of a combination of the head-mounted image display device 13 and a video cassette deck 26. Reference numeral 27 is an image processing means.

What is claimed is:

1. An image display device of eye projection type comprising an image display means for displaying a video image, and a projection optical system for projecting an image displayed on the image display means onto eyes of a viewer; said image display means including a plurality of liquid crystal display elements juxtaposed on the same optical axis as an optical axis of the projection optical system and an illuminating means arranged behind the plural liquid crystal elements and for generating substantially collimated luminous flux, wherein a luminous flux diffusion optical system for diffusing the luminous flux from the plural liquid crystal display elements is arranged between the plural liquid crystal display elements and the projection optical system.

2. An image display device of eye projection type as claimed in claim 1, wherein the luminous flux diffusion optical system is a diffraction grating.

3. An image display device of eye projection type as claimed in claim 1, wherein the illuminating means comprises a point light source and a collimated luminous flux converting optical element by which its focus is set near the point light source so as to convert the luminous flux from the point light source into a substantially collimated luminous flux.

4. An image display device of eye projection type as claimed in claim 3, wherein the luminous flux diffusion optical system is a diffraction grating.

5. An image display device of eye projection type comprising an image display means for displaying a video image, and a projection optical system for projecting an image displayed on the image display means onto eyes of a viewer; said image display means including a plurality of liquid crystal display elements juxtaposed on the same optical axis as an optical axis of the projection optical system and an illuminating means arranged behind the plural liquid crystal elements and for generating substantially collimated luminous flux, said image display device further comprising a measuring means for measuring an inter-relation between a pupil position of a viewer for observing an image displayed on the plural liquid crystal display elements and a position of luminous flux incident on the pupil of the viewer and a moving means for adjusting a positional relation of the pupil and the luminous flux by moving at least one of the illuminating means, the plural liquid crystal display elements and the projection optical system from the data of the positional relation measured by the measuring means.

6. An image display device of eye projection type as claimed in claim 5, wherein said illuminating means comprises a point light source and a collimated luminous flux converting optical element by which its focus is set near the point light source so as to convert the luminous flux from the point light source into a substantially collimated luminous flux.

7. An image display device of eye projection type as claimed in claim 6, wherein said optical element is one of a collimating lens and a concave mirror.

8. An image display device of eye projection type as claimed in claim 5, wherein said measuring means is a charge coupled device and an imaging lens for providing an image of the eyes of the viewer on said charge coupled device.

9. An image display device of eye projection type comprising an image display means for displaying a video image, and a projection optical system for projecting an image displayed on the image display means onto eyes of a viewer; said image display means including a plurality of liquid crystal display elements juxtaposed on the same optical axis as an optical axis of the projection optical system and an illuminating means arranged behind the plural liquid crystal elements and for generating substantially collimated luminous flux, said image display device further comprising a measuring means for measuring an inter-relation between a pupil position of a viewer for observing an image displayed on the plural liquid crystal display elements and a position of luminous flux incident on the pupil of the viewer and a moving means for adjusting a positional relation of the pupil and the luminous flux by moving the point light source from the data of the positional relation measured by the measuring means.

10. An image display device of eye projection type as claimed in claim 9, wherein said illuminating means comprises a point light source and a collimated luminous flux converting optical element by which its focus is set near the point light source so as to convert the luminous flux from the point light source into a substantially collimated luminous flux.

11. An image display device of eye projection type as claimed in claim 10, wherein said optical element is one of a collimating lens and a concave mirror.

12. An image display device of eye projection type as claimed in claim 9, wherein said measuring means is a charge coupled device and an imaging lens for providing an image of the eyes of the viewer on said charge coupled device.

13. An image display device of eye projection type comprising:

first and second image display means each including a point light source, a plurality of liquid crystal display elements superimposed and disposed at a position on which the luminous flux of the point light source is incident;

first and second projection optical systems each having a half mirror provided on a light path of the image display means and a back surface reflecting mirror providing with a coating surface so as to make its refractive index larger than 1 (n>1);

said first image display means being provided so as to be able to display on the right eye of the viewer and said second image display means being provided so as to be able to display on the left eye of the viewer; and said first projection optical system being provided so as to lead the plural images on the right eye of the viewer and said second projection optical system being provided so as to lead the plural images on the left eye of the viewer.

14. An image display device of eye projection type as claimed in claim 13, further comprising a luminous flux diffusion means for diffusing the luminous flux from the plural liquid crystal display elements and arranged between the plural liquid crystal display elements and said first and second projection optical system.

15. An image display device of eye projection type as claimed in claim 13, further comprising a mounting means for mounting said display device on a head of a user and a shutter supported on said mounting means adjacent said half mirror, wherein opening of said shutter enables the user to view external images.

16. An image display device of eye projection type as claimed in claim 13, wherein the projection optical system consists of a prism constructed by a half mirror and a back surface reflecting mirror in a unit form.

17. An image display device of eye projection type as claimed in claim 13, wherein the half mirror and the back surface reflecting mirror are so arranged that the luminous flux emanated from the half mirror forms a bent light path by the back surface reflecting mirror.

18. An image display device of eye projection type as claimed in claim 16, wherein the half mirror and the back surface reflecting mirror are so arranged that the luminous flux emanated from the half mirror forms a bent light path by the back surface reflecting mirror.

* * * * *